United States Patent [19]
Nishino et al.

[11] 3,768,888
[45] Oct. 30, 1973

[54] OPTICAL LOW PASS FILTER

[75] Inventors: Hisashi Nishino; Teruo Hosokawa; Ikuo Hioki, all of Osaka, Japan

[73] Assignee: Minolta Comera K. K., Osaka-fu, Japan

[22] Filed: July 21, 1971

[21] Appl. No.: 164,757

[30] Foreign Application Priority Data
July 28, 1970 Japan.............................. 45/65418

[52] U.S. Cl......... 350/162 SF, 178/5.4 ST, 350/317
[51] Int. Cl. ........................................... G02b 27/38
[58] Field of Search ............................. 178/5.4 ST; 350/162 SF

[56] References Cited
UNITED STATES PATENTS
| | | | |
|---|---|---|---|
| 3,502,799 | 3/1970 | Watanabe...................... | 178/5.4 ST |
| 2,733,291 | 1/1956 | Kell................................ | 178/5.4 ST |
| 3,620,598 | 3/1970 | Brandt......................... | 350/162 SF X |
| 3,619,034 | 1/1970 | Yagi et al..................... | 178/5.4 ST X |

*Primary Examiner*—John K. Corbin
*Attorney*—Stanley Wolder

[57] ABSTRACT

An optical low-pass filter so formed that a rectangular wave phase grating including a plurality of sets of laminae for introducing phase retardation, in which laminae in each set being arranged in parallel with each other and the laminae of different sets being arranged to cross with an angle to each other is inserted in an optical system of the type having a color-encoding filter means disposed in the light path of the optical system for, such as, a single tube color television camera, and high frequency components of an objective image on the color-encoding filter means are attenuated less than a predetermined level, to the image focused on the color-encoding filter means, a degree of blur always larger than the value calculated from the grating period of the color-encoding filter means is given and another image focused on a position distant from said image as far as a predetermined distance brings about no interference to produce another color striped pattern with said color-encoding filter means, regardless of *f*-number of the objective lens and the diaphragm value so as to remove the influence effected by interference between the luminance and chrominance signal.

5 Claims, 11 Drawing Figures

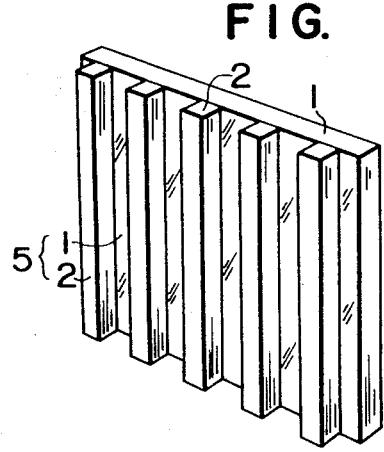
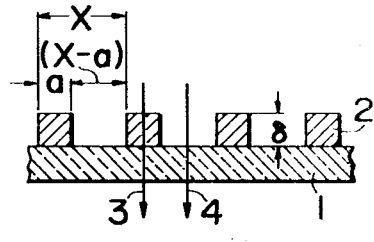
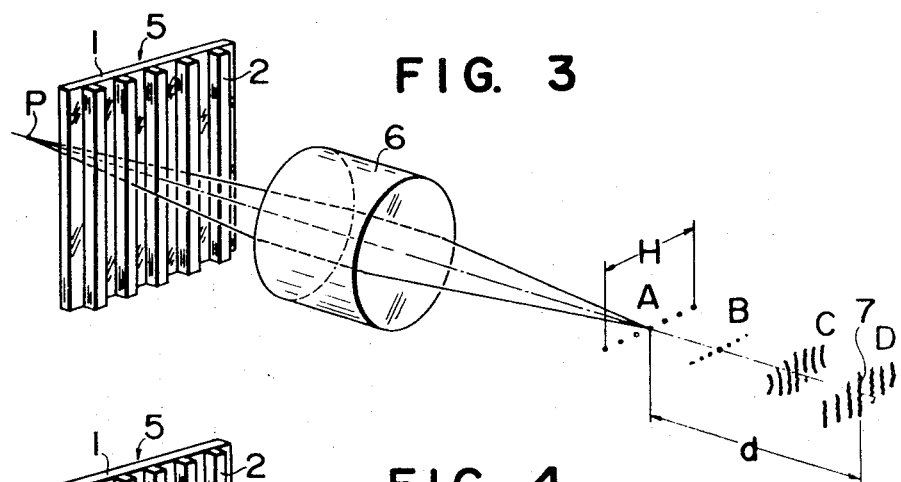
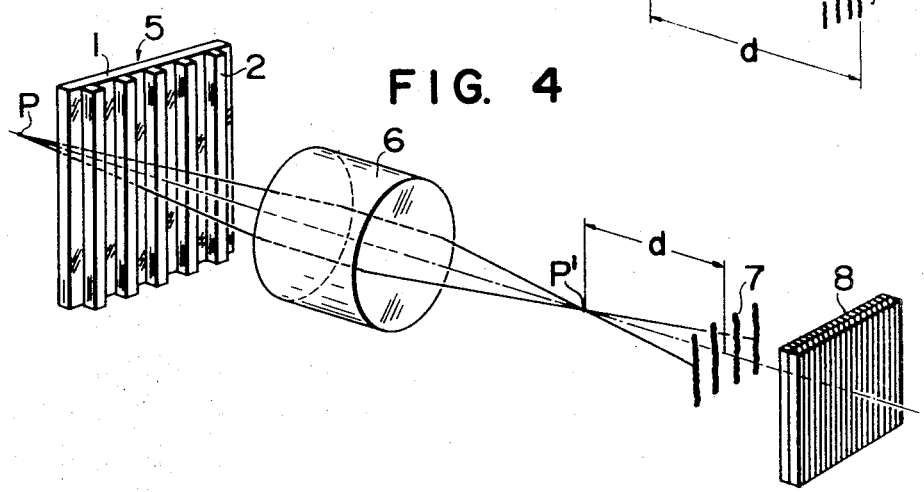

Patented Oct. 30, 1973

INVENTOR.
HISASHI NISHINO
TERUO HOSOKAWA
IKUROU HIOKI

BY Stanley Wolder

OPTICAL LOW PASS FILTER

BACKGROUND OF THE INVENTION

The present invention relates to an optical system having a color-encoding filter means, for example, a single tube color television camera, and an optical low-pass filter in an objective lens system for attenuating beats appearing on the television picture, more particularly relating to an optical system in which the optical low-pass filter is so formed that there is provided a rectangular wave phase grating including a plurality of sets of laminae for introducing phase retardation and laminae in each set being arranged in parallel with each other and the laminae of a different set being arranged to cross with an angle to each other.

In the prior art, for example, in television cameras of a single image tube or two image tube type, it has been well known to make use of an optical system provided with a color-encoding filter means disposed in the light path of the optical system so as to take out three primary color signals.

In such an optical system, for television camera, it has been also well known that a beat of color striped pattern comes out on the picture image in the color television due to mutual interference between color gratings on the color-encoding filter and a picture image focused on the color-encoding filter by the objective lens system as a shape picture image.

In order to attenuate such a beat it is required that high frequency components of the objective image on the color-encoding filter are attenuated less than a predetermined level. In order to satisfy this demand, on the optical system there is provided an optical low-pass filter to a given degree of blur always larger than the value calculated from the grating period of the color-encoding filter to the objective image on the color-encoding filter, regardless of f-number and the diaphragm aperture value of the objective lens system.

As such an optical low-pass filter, it has been known that a polyhedron prism, nylon mesh, or the like has been used, however, every one of them requires trouble in manufacturing and also incorporating into the photographic lens, and accordingly it is not suitable to practical use.

Whereas, this applicant has invented a unique low-pass filter composed of rectangular wave phase grating, on which transparent base plate laminae in equal width for giving a phase retardation δ are regularly disposed with identical pitches in an identical direction, and filed as the patent application Ser. No. 161,454 filed on July 12, 1971 and having the same assignee as the present application. Said optical low-pass filter has the advantage of that the manufacturing is easy because it can be obtained through the conventional vacuum evaporation method and it is easy to incorporate it into the objective lens, while it has the drawbacks in that when a degree of blur to the image of the principal object to be focused on the color-encoding filter takes place beyond a predetermined level, color striped patterns come out through another interference between color gratings on the color-encoding filter and an image to be focused on a position distant from the focal plane for said principal object.

The present invention aims to remove the above-mentioned drawbacks and provide an optical low-pass filter in which all of object images focused and not focused on the color-encoding filter bring about by no means interference between said images and the color-encoding filter.

OBJECTS OF THE INVENTION

One object of the present invention is to provide an optical low-pass filter which is put to use in an optical system having an objective lens and a color-encoding filter means, and that prevents color striped patterns effected picture images from coming out.

Another object of the present invention is to provide an optical low-pass filter which is put to use in optical system having an objective lens and a color-encoding filter means, and that forming no color striped pattern effected by interference to all of object images of said objective lens focusing or not focusing on said grating shaped color filter plane.

Further another object of the present invention is to provide an optical low-pass filter which attains the above-mentioned objects and is easy in manufacturing and in inserting into an optical system.

The other objects of the present invention will be cleared in the detailed description disclosed hereinafter.

SUMMARY OF THE INVENTION

In order to attain the above-mentioned objects, the present invention relates to an optical system having a color-encoding filter means for example, a single tube color television camera and an optical low-pass filter in an objective lens system for attenuating beats appearing on the television picture, wherein the optical low-pass filter is so formed that there is provided a rectangular wave phase grating including a plurality of sets of laminae for introducing phase retardation and laminae in each set being arranged in parallel with each other and the laminae of a different set being arranged to cross at an angle to each other, and high frequency components of an objective image focused on the color-encoding filter means are attenuated less than a predetermined level, by means so arranged that there is given to the image focused on the color-encoding filter means a degree of blur always larger than the value calculated from the grating period of the color-encoding filter means, and another image focused on a position distant from said image insofar as a predetermined distance brings about no interference to produce another color striped pattern with color-encoding filter means.

Through a rectangular wave phase grating having one set of laminae for introducing phase retardation an image of a point focused on a predetermined position by the objective lens system turns to Fraunhofer order diffraction image on a position distant from the focusing point having the spread in the direction as that of laminae disposition, namely, in the direction at right angles to the direction along to laminae, instead of one point image. Depending upon the width of spread of said diffraction image, gradation of said focus image comes out, and when said width of spread is near by about twice the period of the color-encoding filter interference between said focused image and said color-encoding filter can be prevented.

However, in the case of a defocused image positioned on a distant position from the focused point, diffraction striped patterns of the Fresnel order come out, and when period of striped diffraction patterns on a defocus plane approximate to the period of the color-encoding filter interference comes out between said both, and as the result, in an apparatus making use of such an optical system, for example, for a single tube color television camera, color striped patterns come out on the television picture.

However, in the present invention another set of laminae arranged in parallel with each other for introducing phase retardation, and the laminae of the set being arranged to cross at an angle to that of the first set in said direction can attenuate striped diffraction patterns of Fresnel order of the defocused image and color striped patterns effected by the interference between the color-encoding filter and the striped diffraction patterns.

BRIEF DESCRIPTION OF THE DRAWINGS:

FIG. 1 is a perspective view of a phase plate including a rectangular phase grating having a set of laminae.

FIG. 2 is a section view along the arranged direction of laminae on said phase plate.

FIG. 3 is a perspective view showing various diagramatically diffraction images formed at various points through a rectangular phase grating and an objective lens system.

FIG. 4 is a perspective view showing diagramatially the phase where the striped diffraction patterns of an image shown in FIG. 3 and the grating patterns of the color-encoding filter bring about interference therebetween.

DESCRIPTION OF THE PREFERRED EMBODIMENT

Figure 5:
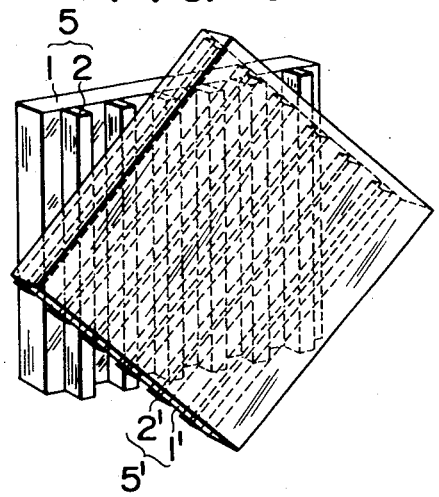
FIG. 5 is a perspective view of one embodiment of the optical low-pass filter in accordance with the present invention, in which two sets of rectangular phase gratings are disposed so that both sets of laminae cross at an angle to each other.

FIG. 1 and FIG. 2 show an optical low-pass filter composed of a rectangular phase grating 5, which constitutes a part of an embodiment in accordance with the present invention and has the phase disposition direction in a single direction, wherein on base plate 1 laminae 2 are arranged in parallel with each other, and provided that the grating pitch of the laminae 2 is X and the width of said lamina 2 is a, the space between adjacent laminae 2 is $X - a$. And, provided the phase retardation effected by said laminae 2 is $\delta$, between light ray 3 through lamina 2 and light ray 4 only through base plate 1 phase difference $\delta$ comes out.

FIG. 3 shows states of various images formed at various points through a rectangular phase grating 5 and an objective lens system 6 and thereby object point P on the optical axis of said objective lens 6 forms various images.

When an optical system 6 is not provided with optical low-pass filter 5, object point P forms a point image on its conjugate point through objective lens system 6; however, when optical system 6 is provided with low-pass filter 5, the image of object point P passes through objective lens system 6 and low-pass filter 5 passes through said conjugate point and brings about a diffraction image of the Fraunhofer order composed of a plurality of point images spread in a straight line in the direction along which gratings of low-pass filter 5 are arranged, onto plane A at right angles ot the optical axis. Through pattern width H of this diffraction image a blur appears on the image. When said width is broader than about twice a grating period of a color-encoding filter for forming in succession a striped pattern, for example, of blue, green, red, and white as shown in FIG. 8, interference between said image and the color-encoding filter can be prevented.

Figure 7:
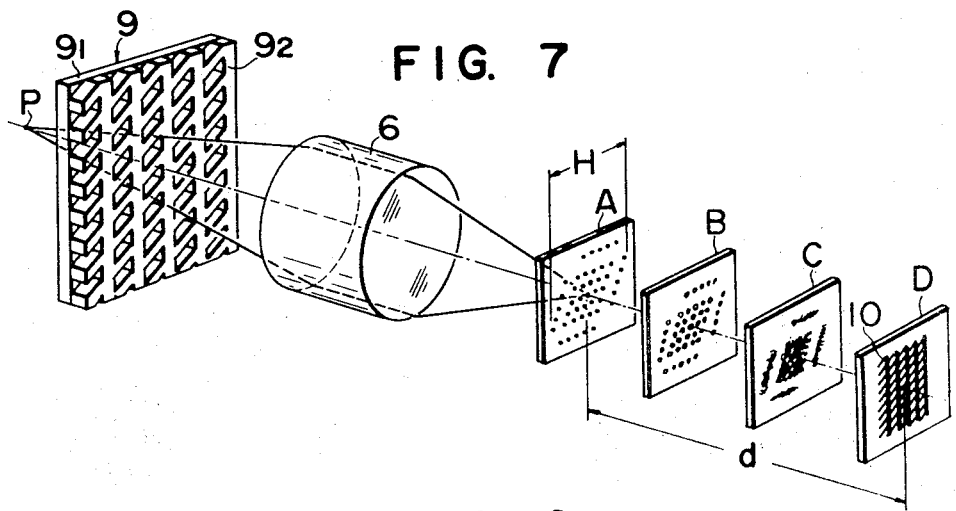
FIG. 7 is a perspective view showing diagramatically diffraction images on the focal plane and the defocus plane in case of that the optical low-pass filter in said embodiment is fitted in the objective lens.

The fact described above is in the case of that the image point is on the focal plane A of objective lens system 6 relative to object point P, however, when this is on the plane B or C distant from the focal plane A, a diffraction striped pattern of the Fresnel order comes out as shown in FIG. 3. And, a very clear diffraction striped pattern 7 comes out in the striped pattern in the same direction as phase grating 2 and in the spread in the direction at right angles to said phase grating 2, on the plane D separated as far as specific length d from focal plane A as shown in FIG. 7.

Figure 8:
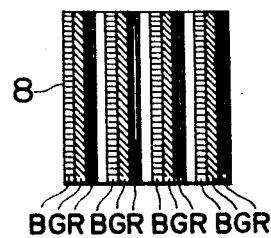
FIG. 8 is a front view showing one example of color-encoding filter.

When the period of said diffraction striped pattern 7 approximates to the grating period of the color-encoding 8 in FIG. 8, interference comes out between them, and if such an optical system is put to use in a color television camera, a beat in a color pattern comes out in regard to an image focused distant from the specific focusing point on the television picture.

As to said phenomenon, according to our experiment, on a defocus image in the case of that objective lens 6 is let out to a certain extent from the position where the focal point coincides, the first interference appears to the image, and when the objective lens system is moved further forwardly from that position where the first interference appears, the second interference is found.

Thereupon, in the present invention, as shown in FIG. 5 two rectangular wave phase gratings 5 and 5' each having base plate 1 or 1' and a set of laminae 2 or 2' arranged in parallel with each other on base plate 1 or 1' as shown in FIG. 1 and FIG. 2 are stacked upon each other so that each base plate 1 and 1' is in parallel with each other and each laminae 2 and 2' on different base plates 1 and 1' is arranged to cross at an angle to each other to form one optical low-pass filter, and providing them so that phase elements 2, 2' may have an inclination to each other.

In such a low-pass filter, having two sets of laminae for introducing phase retardation, diffraction striped pattern 7 of the Fresnel order as shown in FIG. 3 and FIG. 4, which appear in the position D distant from the position A to be focused by phase grating 5 brings about an interference with the diffraction striped pattern 7 of the Fresnel order appears by phase grating 5' crossing to phase grating 5, so that clear diffraction striped patterns of the Fresnel order shown on the plane D in said drawing are brought about by no means.

Figure 6:
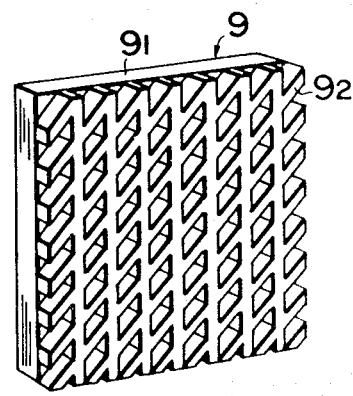
FIG. 6 is a perspective view of another embodiment in accordance with the present invention, having a phase plate including two sets of rectangular phase gratings, in which laminae in each set are arranged in parallel with each other and the laminae of different sets are arranged to cross with an angle to each other on a single base plate.

FIG. 6 shows another embodiment of the optical low-pass filter in accordance with the present invention, which low-pass filter 9 including one base plate $9_1$ and striped pattern $9_2$ having two sets of laminae as rectangular phase grating laminated on base plate $9_1$ the laminae in each set being arranged in parallel with each other and the laminae of a different set being arranged to cross at an angle to each other.

FIG. 7 shows the appearances of diffraction images on focusing plane A and planes B, C, D certain distances distant from focusing plan A of point image P on the optical axis through an optical system including objective lens system 6 and the optical low-pass filter 9 shown in FIG. 6, and diffraction striped patterns 10 generated on plane D in FIG. 7 which corresponds to plane D in FIG. 3 bring about no interference between them and color encoding filter 8 shown in FIG. 4 and FIG. 8.

Therefore, in a single tube color television cameras and the like making use of an image forming optical system having color-encoding 8 provided with said optical low-pass filter, the generation of color striped patterns on the television picture which is effected by interference between object images which focused on the plane to be focused and color-encoding filter 8 can be removed as a matter of course, and also the generation of color striped patterns caused by diffraction striped patterns generated secondarily by object images which focused on a plane distant from the plane to be focused and the color-encoding filter 8 can be removed as well.

Figure 9:
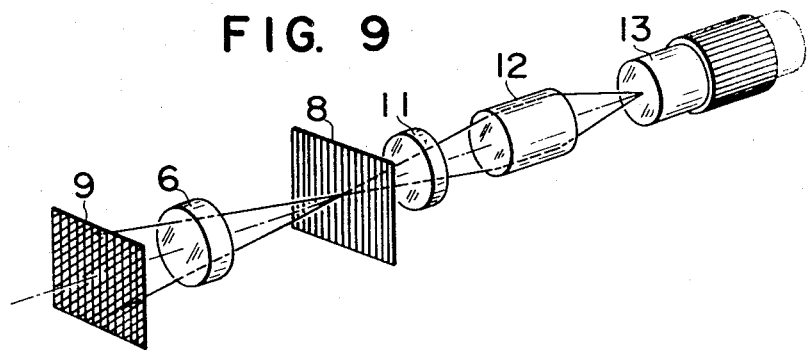
FIG. 9 is a perspective view showing the formation of the essential portions of an optical system for a single tube color television camera in accordance with the present invention.
Figure 11:
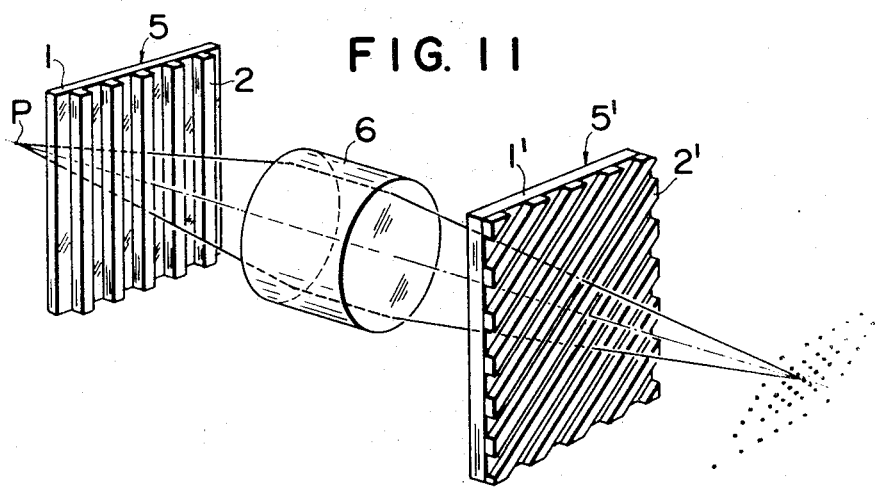
FIG. 11 is a perspective view of an optical system in further another embodiment in accordance with the present invention.

FIG. 9 shows an applied example of the optical system including an optical low-pass filter in accordance with the present invention in an optical system for a single tube television camera, wherein an object image is formed on color-encoding filter 8 shown in FIG. 8 by objective lens system 6 through optical low-pass filter 9, and said object image is separated into picture elements of three primary colors — blue, green, and red — and said picture image separated is formed on the plane of image tube 13 by field lens 11 and relay lens 12, and by scanning this the color signal of the picture image is taken out. In this case the optical low-pass filter 9 is only required to be disposed not only in the position of the pupil of objective lens system 6 but also in the front or rear of said objective lens system 6, and also can be disposed as shown in FIG. 11.

Figure 10:
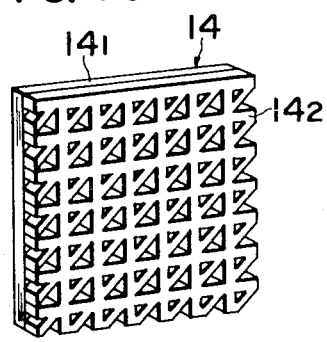
FIG. 10 is a perspective view of an optical low-pass filter of another embodiment in accordance with the present invention.

In the description of the embodiment and the applied example disclosed hereinbefore, the color-filter is in making use of three primary colored strips in parallel with each other in one direction and as the result, now that the optical low-pass filter is in making use of two rectangular wave phase gratings 5 and 5' each having a set of laminae arranged in parallel with each other on each base plate, and each base plate being in parallel with each other and each laminae being arranged to cross at an angle to each other as shown in FIG. 5, or a phase striped pattern having two sets of laminae, the laminae in each set being arranged in parallel with each other and the laminae of a different set being arranged to cross with an angle to each other as shown in FIG. 6, any beat effected by interference between a focused image or a defocused image on the color-encoding filter and color stripes of the color-encoding filter can be perfectly removed, however, in the case of a color-encoding filter having two sets of color striped patterns being arranged to cross each other, it is required that the optical low-pass filter 14 including one base plate $14_1$ and a striped pattern $14_2$ having three sets of laminae for introducing phase retardation laminated on base plate $14_1$, the laminae in each set being arranged in parallel with each other and the laminae of a different set being arranged to cross one another as shown in FIG. 10 is put to use, or the optical low-pass filter 5 formed with two rectangular wave phase gratings, one of which having a set of laminae on the base plate as shown in FIG. 1, and the other of which having two sets of laminae on the base plate as shown in FIG. 6 are stacked upon each other so that the set of laminae of the former is arranged to cross both sets of laminae of the latter.

Thus, by arranging to cross one set of laminae for introducing phase retardation with the other set of laminae each time when sets of color striped patterns cross one another in the color-encoding filter is increased by one, interference between diffraction image patterns of the Fraunhofer order and the Fresnel order and color-encoding filter can be eliminated.

What is claimed is:

1. In an optical system for introducing an image of an object scene to an image tube in a color television system and having a color encoding filter means disposed in the lightpath of said optical system and serving to spacially modulate at least two of three primary color images, the optical system comprising optical low pass filter means disposed between said object scene and said color encoding filter and including a plurality of sets of laminae for introducing phase retardation, laminae in each set being arranged in parallel with each other and disposed at an angle to the laminae of at least one other set, and laminae in one of the sets being so arranged to attenuate beats effected by interrelation between said color encoding filter and high frequency components in said object scene.

2. An optical system as set forth in claim 1, wherein said low-pass filter further comprises a transparent base plate on which said plurality of sets of laminae are mounted in combination with each other.

3. An optical system as set forth in claim 1, wherein each set of laminae is respectively mounted on a transparent base plate to form a low-pass filter.

4. An optical system as set forth in claim 3, further comprising an objective lens on both sides of which the low-pass filters are disposed perpendicularly to the optical axis of the objective lens.

5. An optical system as set forth in claim 1, wherein each lamina is rectangular in cross section, and each set of laminae is mounted on a transparent base plate in the form of a rectangular wave phase diffraction grating.

* * * * *